(12) United States Patent  (10) Patent No.: US 6,662,272 B2
Olarig et al.  (45) Date of Patent: Dec. 9, 2003

(54) DYNAMIC CACHE PARTITIONING

(75) Inventors: Sompong P. Olarig, Pleasanton, CA (US); Phillip M. Jones, Spring, TX (US); John E. Jenne, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/967,614

(22) Filed: Sep. 29, 2001

(65) Prior Publication Data

US 2003/0065886 A1 Apr. 3, 2003

(51) Int. Cl.[7] .............................................. G06F 12/08
(52) U.S. Cl. ........................ 711/129; 711/121; 711/133
(58) Field of Search .................................. 711/153, 129, 711/121, 133

(56) References Cited

U.S. PATENT DOCUMENTS

| | | | | |
|---|---|---|---|---|
| 4,371,929 A | * | 2/1983 | Brann et al. ................. | 710/45 |
| 4,905,141 A | * | 2/1990 | Brenza ........................ | 711/129 |
| 5,293,609 A | * | 3/1994 | Shih et al. .................. | 711/137 |
| 5,325,504 A | | 6/1994 | Tipley et al. | |
| 5,369,753 A | | 11/1994 | Tipley | |
| 5,426,765 A | | 6/1995 | Stevens et al. | |
| 5,692,154 A | | 11/1997 | Tucker et al. | |
| 5,829,027 A | | 10/1998 | Goodrum | |
| 6,272,598 B1 | * | 8/2001 | Arlitt et al. ................. | 711/133 |
| 6,360,303 B1 | * | 3/2002 | Wisler et al. ............... | 711/152 |
| 6,457,102 B1 | * | 9/2002 | Lambright et al. ......... | 711/129 |
| 6,493,800 B1 | * | 12/2002 | Blumrich ..................... | 711/129 |

OTHER PUBLICATIONS

Guohua Jin et al., *An Efficient Solution to the Cache Thrashing Problem*, pp. 1–26 (Mar. 4, 1996).

* cited by examiner

Primary Examiner—Hiep T. Nguyen

(57) ABSTRACT

A cache-based system is adapted for dynamic cache partitioning. A cache is partitioned into a plurality of cache partitions for a plurality of entities. Each cache partition can be assigned as a private cache for a different entity. If a first cache partition satisfying a first predetermined cache partition condition and a second cache partition satisfying a second predetermined cache partition condition are detected, then the size of the first cache partition is increased by a predetermined segment and the size of the second cache partition is decreased by the predetermined segment. An entity can perform cacheline replacement exclusively in its assigned cache partition, and also be capable of reading any cache partition.

18 Claims, 5 Drawing Sheets

DYNAMIC CACHE PARTITIONING

CROSS-REFERENCE TO RELATED APPLICATIONS

Not Applicable.

STATEMENTS REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Field of the Invention

The present invention generally relates to cache organization and more particularly to dynamic cache partitioning.

2. Description of the Related Art

In a computer system, a cache is the first level of memory hierarchy encountered once an address leaves a processor toward a memory subsystem. A cache uses the principle of locality to buffer commonly used addresses. Caches improve system performance by reducing memory access latencies and by reducing bandwidth consumption on a processor front side bus. A cache operates on a processor backside bus with processors such as Intel's Pentium III Xeon processor. Many of today's processors include integrated level-one (L1) and level-two (L2) caches. Computer systems can employ a cache external to the processor in addition to these internal caches.

Modern operating systems can issue multiple threads and processes that may share a cache. When a thread or process is pre-empted, the new thread or process could replace the cache contents of the previous thread or process. When the original thread or process returns, its memory ranges may no longer be cached. The original thread or process may then cache its memory ranges and replace what was cached by the previous thread or process. This behavior is termed "thrashing" a cache. Operating systems and more generally the overall software model of computer systems can significantly contribute to cache thrashing.

Multi-processor computer systems in which multiple processors share a cache also greatly contribute to cache thrashing. For instance, a context switch may occur that shifts to a process for a processor after a previous process for a different processor was cached. Similarly, when logical processors become available from a single physical processor package, threads or processes for one logical processor will likely pre-empt previous threads or processes of another logical processor and replace the cache contents of these previous threads or processes.

Increasing the associativity of caches, optimizing process or thread scheduling and optimizing memory management are common strategies employed in an effort to address cache thrashing.

BRIEF SUMMARY OF THE INVENTION

Briefly, a cache-based system is adapted for dynamic cache partitioning. A cache is partitioned into a plurality of cache partitions for a plurality of entities. Each cache partition can be assigned as a private cache for a different entity. If a first cache partition satisfying a first predetermined cache partition condition and a second cache partition satisfying a second predetermined cache partition condition are detected, then the size of the first cache partition is increased by a predetermined segment and the size of the second cache partition is decreased by the predetermined segment. An entity can perform cacheline replacement exclusively in its assigned cache partition, and also be capable of reading any cache partition.

BRIEF DESCRIPTION OF THE SEVERAL VIEWS OF THE DRAWINGS

A better understanding of the present invention can be obtained when the following detailed description of some embodiments is considered in conjunction with the following drawings in which.

DETAILED DESCRIPTION OF THE INVENTION

Figure 1:
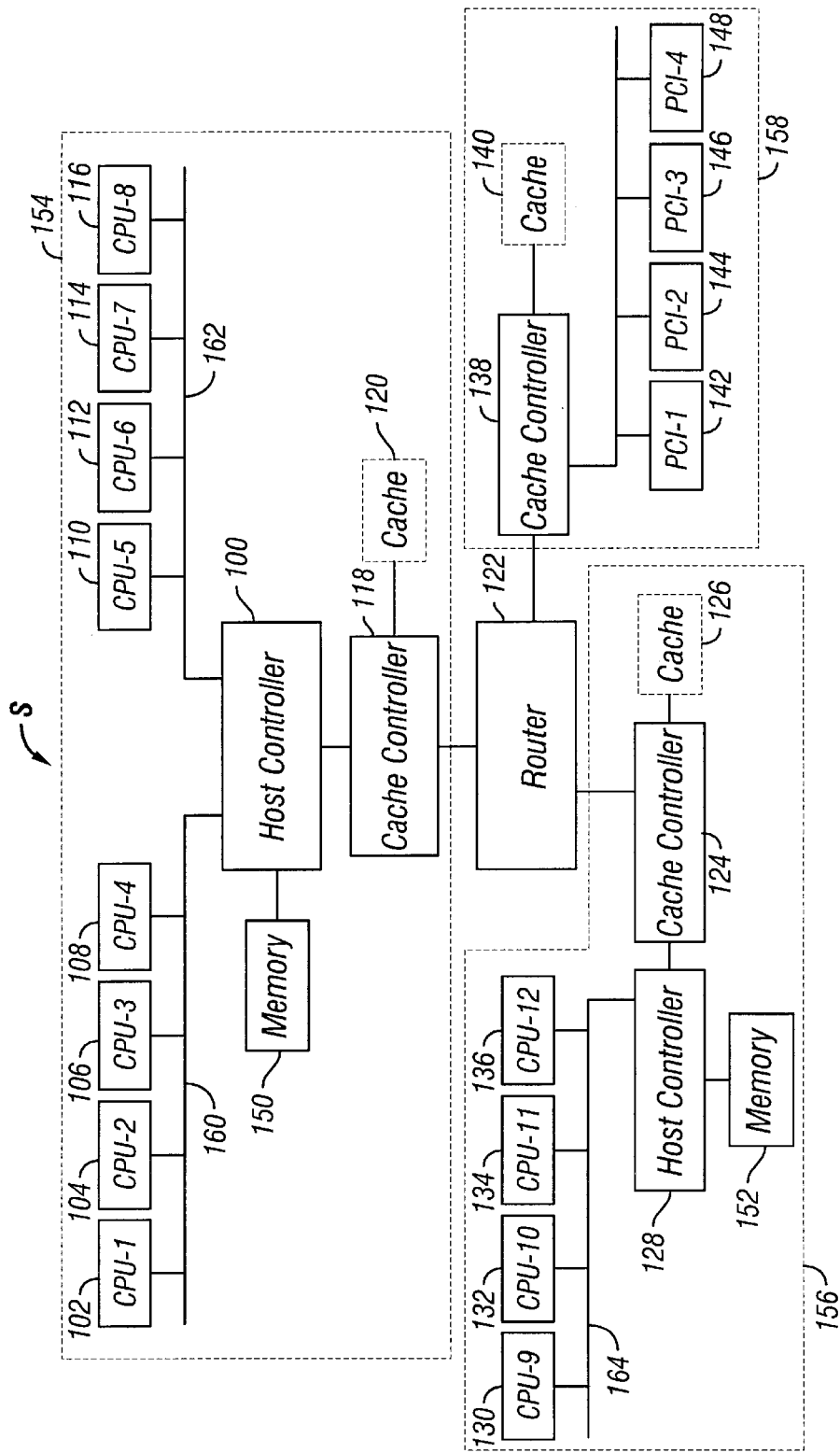
FIG. 1 is a block diagram of an exemplary multi-processor computer system employing partitioned caches.

Turning now to the Figures, FIG. 1 illustrates an exemplary multi-processor computer system S employing partitioned caches. The computer system S is a multi-node server including a router or switch 122 coupled to a processor-based node 154, a processor-based node 156 and an input/output (I/O)-based node 158. The processor-based node 154 provides a host controller 100 coupled to processor buses 160 and 162, a memory 150 and a cache controller 118. Processors 102–108 reside on the processor bus 160, and processors 110–116 reside on the processor bus 162. The cache controller 118 is coupled to the router 122 and a cache 120. The cache 120 generally buffers incoming activity or traffic for the processor-based node 154. The processor-based node 156 provides a host controller 128 coupled to a processor bus 164, a cache controller 124 and a memory 152. Processors 130–136 reside on the processor bus 164. The cache controller 124 is coupled to the router 122 and a cache 126. The cache 126 generally buffers incoming activity or traffic for the processor-based node 156. The I/O-based node 158 provides a cache controller 138 coupled to the router 122, a cache 140 and a input/output bus 166. The cache 140 generally buffers incoming activity or traffic for the I/O-based node 158. Input/output resources 142–148, such as Peripheral Component Interconnect (PCI) buses, reside on the input/output bus 166. While host controllers 100 and 128 are represented distinctly from cache controllers 118 and 124, it should be understood that alternatively a host controller can be integrated with a cache controller.

Any of caches 120, 126 and 140 can be partitioned into cache portions or bins which behave as multiple caches. Cache address space is divided among these cache partitions. Each cache partition of the cache 120, 126 or 140 can be assigned a different logical or physical entity. For example, the cache 120 can be partitioned into two cache bins with one cache bin dedicated to the processor bus 160 and the other cache bin dedicated to the processor bus 162.

Alternatively, the cache 120 can be partitioned into eight bins with each bin dedicated to a different processor of the processors 102–116. As another example, the cache 140 can be partitioned into four bins with each bin dedicated to a different PCI resource of the PCI resources 142–148. Other examples of entities that can be allocated dedicated cache partitions include processes, threads and nodes. It should be understood that this list is only illustrative and not exhaustive of the many types of entities present or supported within a computer system.

A partitioned cache represents a departure from traditional cache organization. Each cache partition acts as a private cache for its assigned entity. In other words, an entity has certain exclusive rights in its assigned cache partition. This avoids any entity having its cached data thrashed by another entity. This may be particularly advantageous for entities with substantially unrelated processes or threads. In a traditional cache organization, progress is lost in a cache due to cache thrashing by activity among different entities sharing the cache. It should be understood that a partitioned cache can support additional levels of partitioning such as by partitioning a cache partition into multiple cache sub-partitions.

Figure 2:
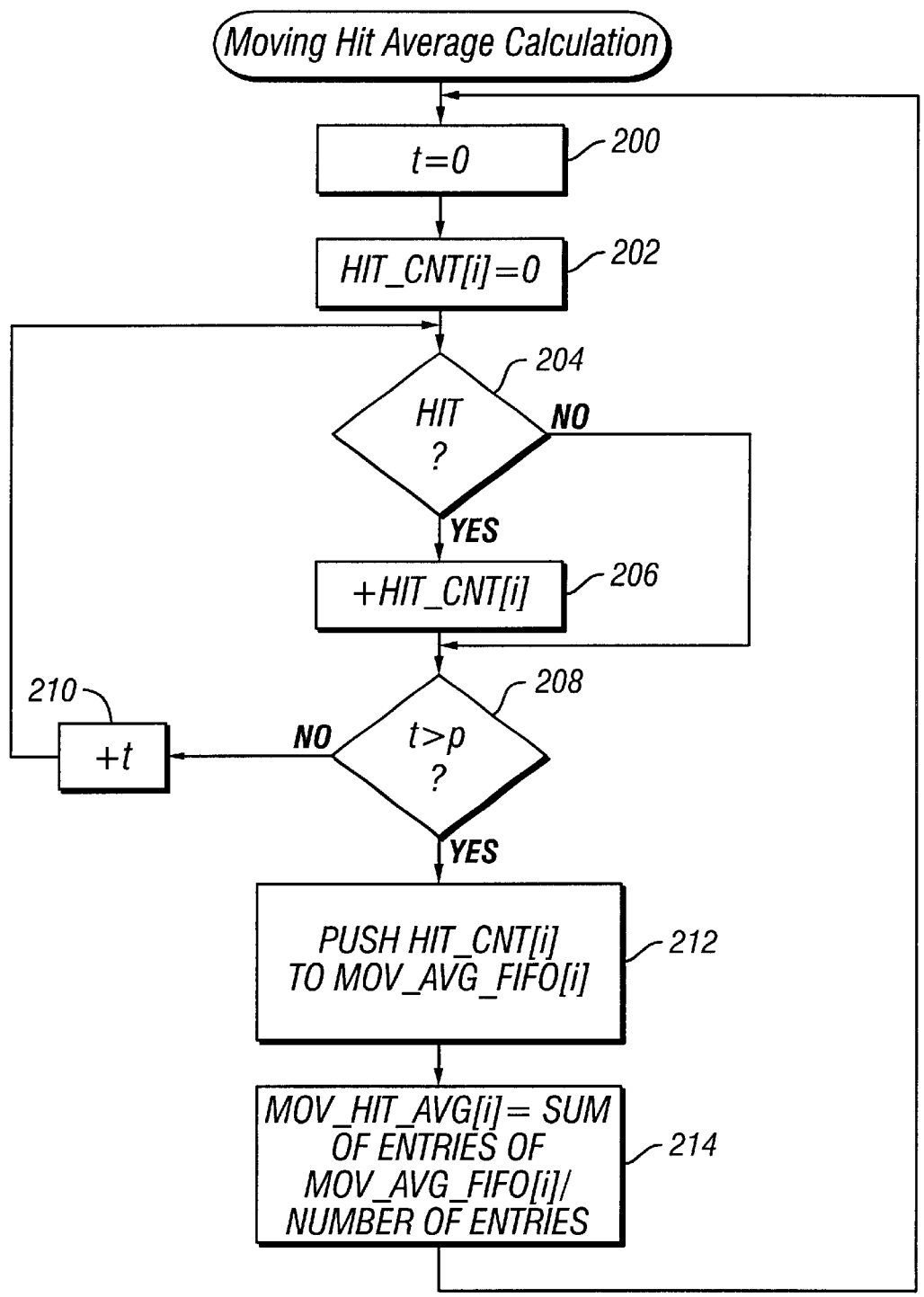
FIG. 2 is a flow chart of an exemplary moving hit average calculation technique for a partitioned cache of FIG. 1.

While a partitioned cache represents one form of cache optimization, a partitioned cache can be further optimized by reallocating the sizes of cache partitions based on the activity of the particular cache partitions. One cache statistic that may be useful in identifying cache partitions that are candidates for size reallocation is a moving or running hit average. This cache statistic represents an average number of hits to a cache partition over a particular period of time. Referring to FIG. 2, an exemplary moving hit average calculation technique is shown. This technique can be performed in parallel by a cache controller for each cache partition of its cache. Beginning in step 200, the t variable representing time is set to zero. Next, in step 202, a hit counter HIT_CNT[i] is set to zero. The i variable is an index used to represent a particular cache partition.

From step 202, the process proceeds to step 204 where it is determined if there is a hit to the cache partition. A hit indicates that the requested data is present in the particular cache partition. If the cache controller is aware of the address range of each cache partition of its cache, the cache controller can determine which cache partition to credit with a hit. Alternatively, a hit may be associated with a particular cache partition based on a unique identifier associated with its assigned entity. If a hit is detected in step 204, in step 206, the hit counter HIT_CNT[i] is incremented by one. Next, in step 208, it is determined if the t variable is greater than a p variable, representing the particular period of time to be used in determining the moving hit average. The process also proceeds to step 208 if a hit is not detected in step 204. If the t variable is not greater than the p variable, then the t variable is incremented in step 210. From step 210, the process returns to step 204. The time increment in step 210 thus represents how often the process checks for hits to a cache partition.

When the t variable is determined to be greater than the p variable, then the process proceeds from step 208 to step 210 where the value in the hit counter HIT_CNT[i] is pushed or copied into a moving average FIFO, MOV_AVG_FIFO[i]. Next, in step 214, a moving hit average MOV_HIT_AVG[i] is set to the sum of the entries in MOV_AVG_FIFO[i] divided by the number of entries in MOV_AVG_FIFO[i]. The depth of the MOV_AVG_FIFO can influence the frequency with which a cache partition becomes a candidate for size reallocation. For instance if the MOV_AVG_FIFO is relatively deep, then transient behavior will tend to be filtered out. This avoids peaks and troughs of hit activity for a relatively short period of time grossly affecting the moving hit average. In this way, the MOV_AVG_FIFO can be used to more closely tracking a real trend of a cache partition.

From step 214, the process returns to step 200 for the process to be repeated. The process thus continues to iterate through steps 200–214, such that the history of hits to the particular cache partition is continuously maintained. As a result of step 212, MOV_AVG_FIFO[i] grows with the number of hits detected during each iteration. As a result of step 214, the moving hit average MOV_HIT_AVG[i] is updated based on the number of hits detected during the current iteration and the previous iterations. This moving hit average calculation technique, which generally serves as a moving average FIFO filter, is exemplary in that other ways of capturing cache statistics for tracking cache partition trends can be employed. It should also be understood that a moving hit average is only an exemplary cache statistic. Another example of a cache statistic that may be useful is the ratio of hits to the numbers of hits and misses to a cache partition. A miss indicates that the requested data is not present in the particular cache partition. These two cache statistics are not exhaustive of the possible cache statistics that can be employed.

Figure 3:
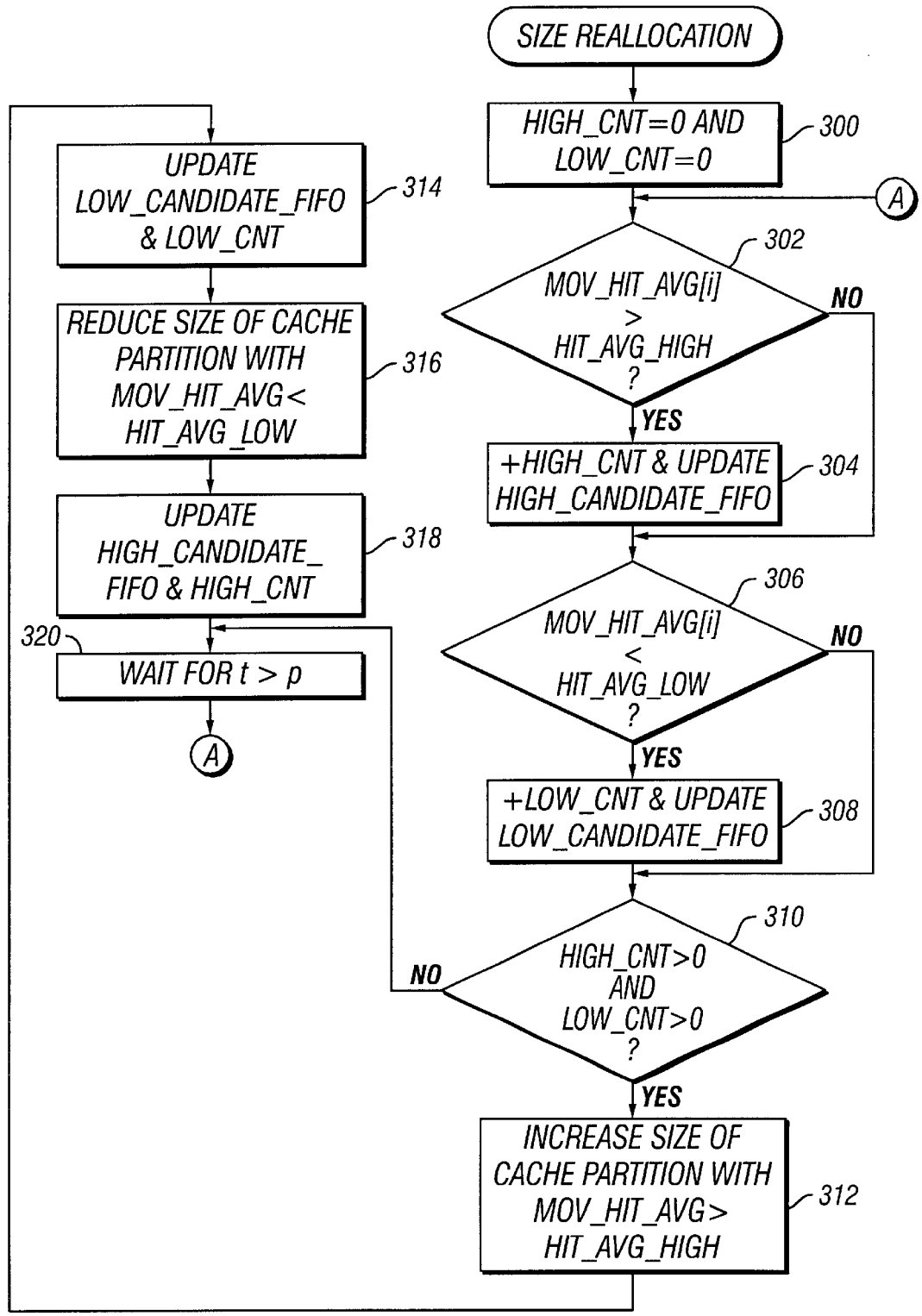
FIG. 3 is a flow chart of an exemplary size reallocation technique for a partitioned cache of FIG. 1 in accordance with FIG. 2.

Referring to FIG. 3, an exemplary size reallocation process is shown. This process can be performed by a cache controller utilizing the moving hit average MOV_HIT_AVG[i] determined in FIG. 2. Beginning in step 300, HIGH_CNT and LOW_CNT are initialized to zero. The HIGH_CNT variable is used to represent the number of cache partition candidates for a size increase, and the LOW_CNT variable is used to represent the number of cache partition candidates for a size decrease. Next, in step 302, it is determined if the moving hit average MOV_HIT_AVG[i] is greater than a predetermined upper hit average threshold HIT_AVG_HIGH. If so, then HIGH_CNT is incremented by one and a HIGH_CANDIDATE_FIFO is updated in step 304. The HIGH_CANDIDATE_FIFO stores the unique identifier for the entity associated with the cache partition identified as a candidate for a size increase. Next, in step 306, it is determined if the moving hit average MOV_HIT_AVG[i] is less than a predetermined low hit average threshold HIT_AVG_LOW. If so, then LOW_CNT is incremented by one and a LOW_CANDIDATE_FIFO is updated in step 308. The LOW_CANDIDATE_FIFO stores the unique identifier for the entity associated with the cache partition identified as a candidate for a size decrease. If the moving hit average MOV_HIT_AVG[i] is not greater than the predetermined upper hit average threshold HIT_AVG_HIGH in step 302, then the process also proceeds to step 306.

Steps 302 and 306 together define the reallocation criteria for identifying cache partitions as reallocation candidates. This exemplary choice of reallocation criteria depends on the behavior of at least two cache partitions where one cache partition is trending higher and another cache partition is trending lower. By not focusing strictly on the trend for one cache partition, the size of one cache partition is not optimized at the expense of the size of another cache partition. Instead, the process optimizes the size allocation of each cache partition. Size reallocation for cache partitions presents a flexible cache solution for minimizing cache thrashing. A further advantage is that the organization of the partitioned cache dynamically adapts to the current trend or activity of the cache partitions.

Reallocation criteria for identifying cache partitions as reallocation candidates can be determined in a variety of ways. One way is for the user to pre-define the criteria. This criteria may or may not filter transient-based behavior. Another approach is for trace data to be captured and studied such that criteria are selected based on performance analysis. Similarly, reallocation schemes can be employed in a variety of ways. One sophisticated approach can involve a searching or tracking algorithm for locating certain trends or "hot spot" activity in behavior of the cache partitions. In this context, "hot spot" activity generally refers to an area in a computer system with frequent cache activity, suggesting a larger cache partition for that area would be helpful. A couple of factors worth considering in choosing a reallocation scheme are ease of implementation in hardware and ease of testing.

Following step 308, it is determined if HIGH_CNT is greater than zero and if LOW_CNT is greater than zero in step 310. If it is determined that the moving hit average MOV_HIT_AVG[i] is not less than a predetermined lower hit average threshold HIT_AVG_LOW in step 306, then the process also proceeds to step 310. If HIGH_CNT is greater than zero and if LOW_CNT is greater than zero, indicating there is at least one cache partition candidate for a size increase and at least one cache partition candidate for a size decrease, then the process proceeds to step 312. The process thus will not proceed to step 312 if there are only candidates for a size increase or if there are only candidates for a size decrease.

In step 312, the size of the cache partition with the moving hit average MOV_HIT_AVG[i] greater than the predetermined upper hit average threshold HIT_AVG_HIGH is increased by a predetermined segment. This serves to reduce the likelihood of cache misses to the particular cache partition. For this particular example, a fixed segment size is assumed. From step 312, the process proceeds to step 314 where the LOW_CANDIDATE_FIFO and the LOW_CNT are updated. This update entails removing the unique identifier for the entity assigned to the cache partition increased in size in step 312 from the LOW_CANDIDATE_FIFO and reducing the LOW_CNT by one, representing that cache partition. Next, in step 316, the size of the cache partition with the moving hit average MOV_HIT_AVG[i] less than the predetermined lower hit average threshold HIT_AVG_LOW is decreased by the predetermined segment. Following step 316, the HIGH_CANDIDATE_FIFO and the HIGH_CNT are updated in step 318. This update entails removing the unique identifier for the entity assigned to the cache partition decreased in size in step 316 from the HIGH_CANDIDATE_FIFO and reducing the HIGH_CNT by one, representing that cache partition.

From step 318, the process proceeds to step 320 where the process waits for t to be greater than p where p represents the period of time before the moving hit average MOV_HIT_AVG[i] is updated. The process also proceeds to step 320 if HIGH_CNT is not greater than zero and LOW_CNT is not greater than zero in step 310. From step 320, the process returns to step 302. The process thus undergoes a new iteration with each updated moving hit average MOV_HIT_AVG[i].

Figure 4:
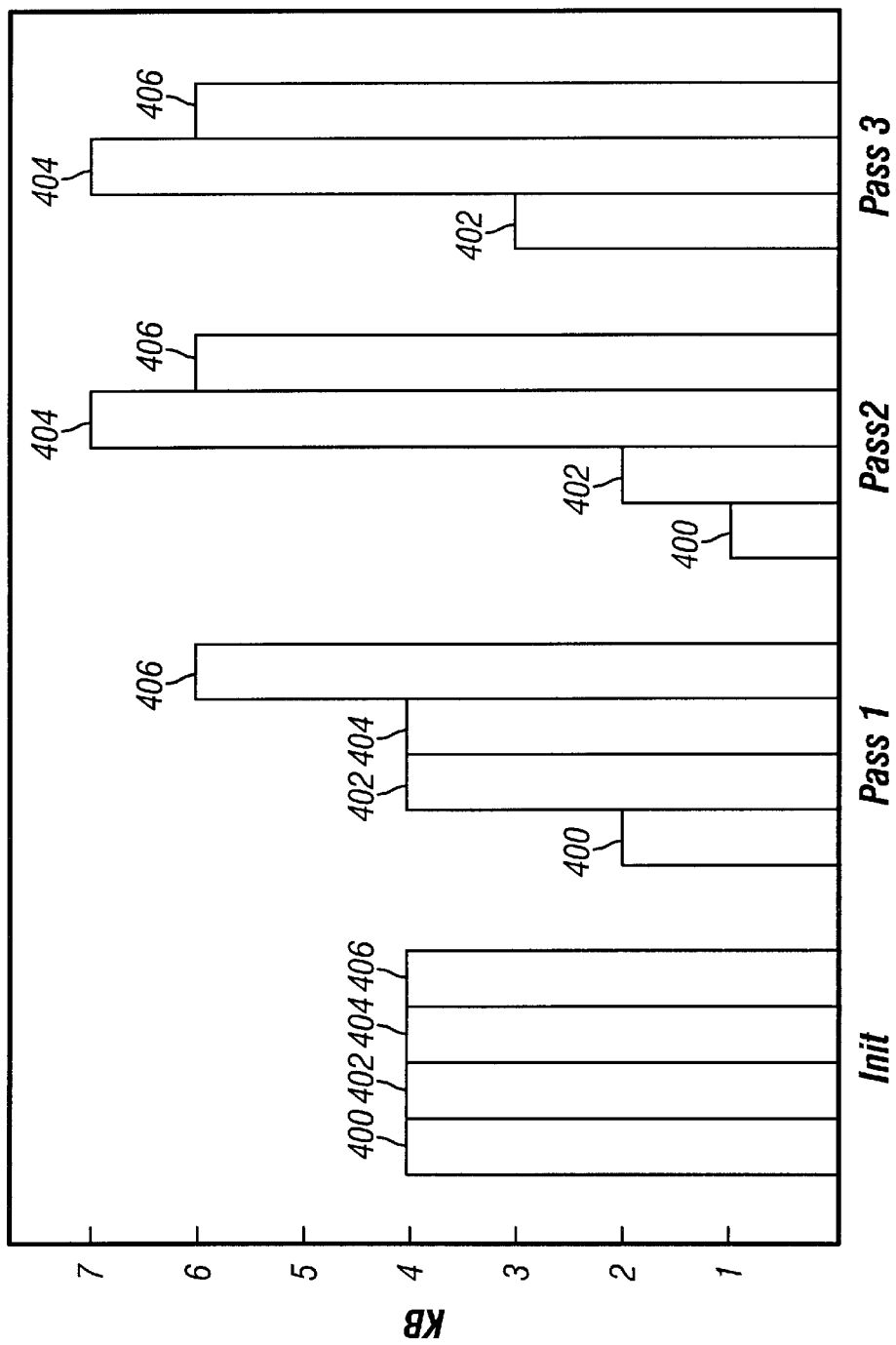
FIG. 4 is a bar chart illustrating an example of size reallocation for a partitioned cache of FIG. 1.

Referring to FIG. 4, an example of size reallocation for a partitioned cache is shown. Cache partitions 400–406 are initially each allocated 4 KB of cache address space. Each cache partition may be a private cache for different entity. In pass 1, cache partition 400 was reduced by a 2 KB segment from 4 KB to 2 KB and cache partition 406 was increased by a 2 KB segment from 4 KB to 6 KB. Thus, 2 KB of cache address space was reallocated from cache partition 400 to cache partition 406. In pass 2, cache partition 400 was reduced by a 1 KB segment from 2 KB to 1 KB, cache partition 402 was reduced by a 2 KB segment from 4 KB to 2 KB, and cache partition 404 was increased by a 3 KB segment from 4 KB to 7 KB. As compared to pass 1, pass 2 affects the size of three cache partitions and involves a variable segment size. This can be accomplished with a sizing reallocation scheme utilizing multiple upper and lower hit average thresholds. For example, three upper hit average thresholds and three lower hit average thresholds may be supported. If a moving hit average crosses or exceeds a first upper hit average threshold, then the particular cache partition becomes a candidate for gaining a 1 KB segment. If a moving hit average crosses a second upper hit average threshold, then the particular cache partition becomes a candidate for gaining a 2 KB segment. If a moving hit average crosses a third upper hit average threshold, then the particular cache partition becomes a candidate for gaining a 2 KB segment.

If a moving hit average crosses or falls below a first lower hit average threshold, then the particular cache partition becomes a candidate for losing a 1 KB segment. If a moving hit average crosses a second lower hit average threshold, then the particular cache partition becomes a candidate for losing a 2 KB segment. If a moving hit average crosses a third lower hit average threshold, then the particular cache partition becomes a candidate for losing a 3 KB segment. Pass 2 corresponds to the cache partition 400 crossing the first lower hit average threshold, the cache partition 402 crossing the second lower hit average threshold and the cache partition 404 crossing the third upper hit average threshold. In pass 3, cache partition 400 has been decreased by a 1 KB segment from 1 KB to zero, and cache partition 402 is increased by a 1 KB segment from 2 KB to 3 KB. This corresponds to cache partition 400 crossing the first lower hit average threshold and cache partition 402 crossing the first upper hit average threshold. The shrinking of cache partition 400 in Pass 3 shows that a cache partition can be sized so as to eliminate the cache partition altogether. By shrinking cache partition 400 to zero, the number of cache partitions is changed from four to three. Cache partition 400 was eliminated since it had too little cache activity. FIG. 4 thus presents exemplary reallocation cycles or iterations to help illustrate how sizing for cache partitions can be adaptively modified.

Figure 5:
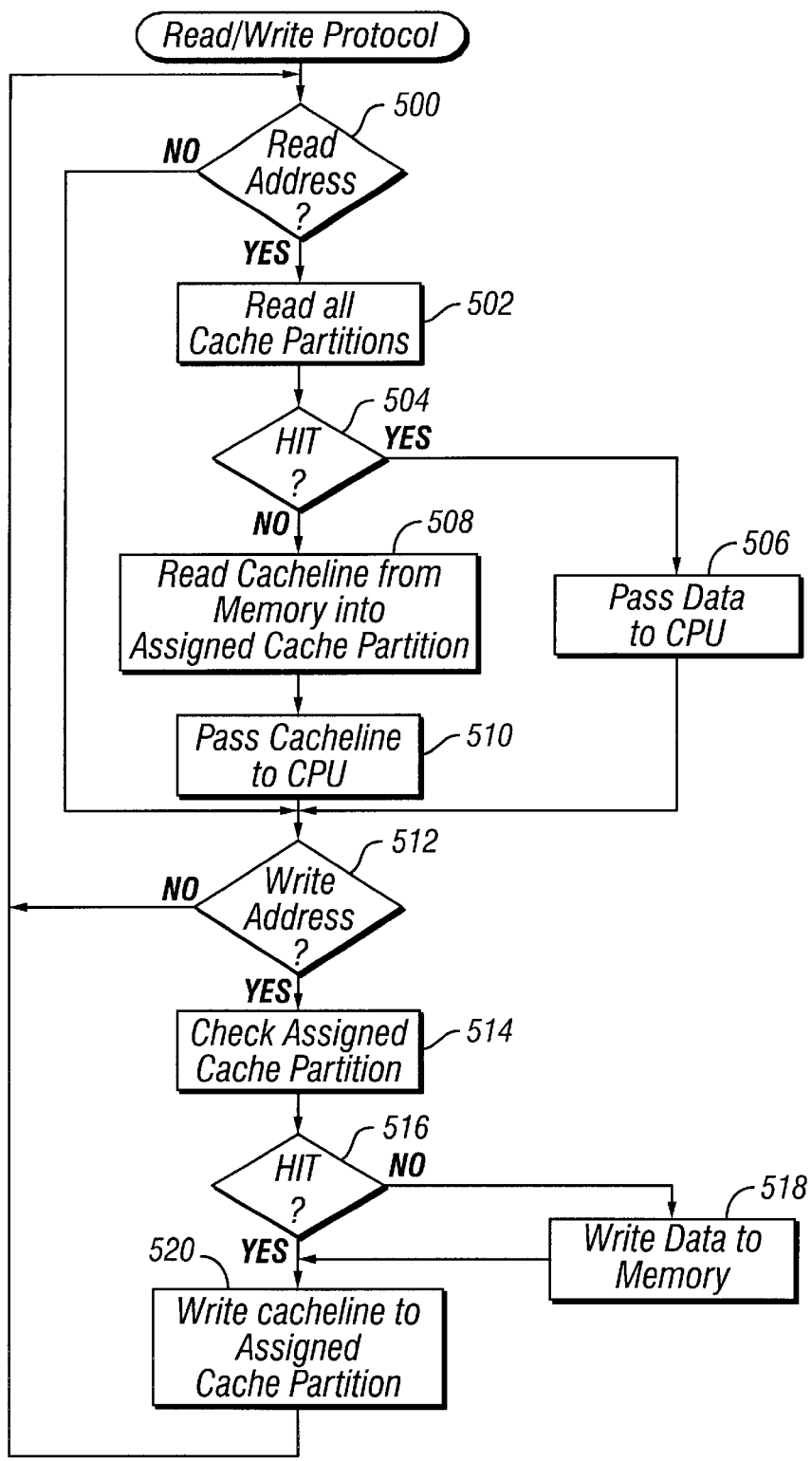
FIG. 5 is a flow chart of an exemplary read/write protocol for a partitioned cache of FIG. 1 involving optimized cacheline replacement.

Referring to FIG. 5, an exemplary read/write protocol for a partitioned cache is shown. Beginning in step 500, it is determined if there is a read address. If there is a read address, then all cache partitions are read in step 502. Next, in step 504, it is determined if there is a hit to the particular cache partition. If there is not a hit, then the process proceeds to step 508 where a cacheline from memory is read into the assigned cache partition. Step 508 represents an optimized cacheline replacement. Cacheline replacement is performed exclusively in the assigned cache partition. Following step 508, the cacheline is passed to the processor or other data requester. If a hit is detected in step 504, then the data is passed to the processor in step 506. From step 510 and 506, the process proceeds to step 512 where is it determined if a write address is detected. The process also arrives in step 512 if a read address is not detected in step 500. If a write address is not detected in step 512, then the process returns to step 500. If a write address is detected in step 512, then the process checks for whether the data corresponding to the write address is in the particular cache partition. Next, in step 516, it is determined if there is a hit to the cache partition. If there is a hit, the process proceeds to step 520 where the cacheline is written to the cache partition. If a hit is not detected in step 516, then the process proceeds to step 518 where the data is written to memory. From step 518, the process proceeds to the previously described step 520. From step 520, the process returns to step 500. The process thus loops such that any read address and write address is processed in the same fashion as described above.

The foregoing disclosure and description of the various embodiments are illustrative and explanatory thereof, and various changes in the nodes, server architecture, entities, cache partitions, trend statistics, filtering, cache controller, size reallocation scheme, segment size, counting and averaging, as well as in the details of the illustrated circuitry and construction and method of operation may be made without departing from the spirit and scope of the invention.

We claim:

1. A method of cache partitioning, comprising the steps of:
    partitioning a cache into a plurality of cache partitions;
    assigning a cache partition of the plurality of cache partitions as a private cache for an entity;
    detecting a first cache partition satisfying a first predetermined cache partition condition;
    detecting a second cache partition satisfying a second predetermined cache partition;
    increasing a size of the first cache partition by a predetermined segment; and
    decreasing a size of the second cache partition by the predetermine segment, wherein the first predetermined cache partition condition comprises an average number of hits to the first cache partition crossing a predetermined upper hit average threshold and the second predetermined cache partition condition comprises an average number of hits to the second cache partition crossing a predetermined lower hit average threshold.

2. The method of claim 1, further comprising the step of:
    assigning each entity of a plurality of entities a different cache partition of the plurality of cache partitions as a private cache.

3. The method of claim 1, further comprising the step of: performing cacheline replacement for the entity exclusively in the private cache.

4. The method of claim 1, further comprising the step of:
    reading the plurality of cache partitions for the entity.

5. The method of claim 1, further comprising the step of:
    size reallocating for a set of cache partitions of the plurality of cache partitions.

6. The method of claim 1, further comprising the step of:
    reallocating the number of the plurality of cache partitions.

7. A partitioned cache system, comprising:
    a plurality of cache partitions with at least one cache partition assigned as a private cache for an entity; and
    a controller comprising a cache controller configured to detect a predetermined cache partition condition for size reallocating a set of cache partitions of the plurality of cache partitions, wherein the predetermined cache partition condition comprises an average number of hits to a first partition of the set crossing a predetermined upper hit average threshold and an average number of hits to a second cache partition of the set crossing a predetermined lower hit average threshold.

8. The cache system of claim 7, wherein each entity of a plurality of entities is assigned a different cache partition of the plurality of cache partitions as a private cache.

9. The cache system of claim 7, wherein only the private cache is cacheline replaceable for the entity.

10. The cache system of claim 7, wherein the plurality of cache partitions are readable by the entity.

11. The cache system of claim 7, wherein the controller comprises a cache controller configured to reallocate the number of the cache partitions.

12. The cache system of claim 7 wherein the controller comprises a cache controller configured to size reallocate a set of cache partitions of the plurality of cache partitions.

13. A cache-based system, comprising:
    a plurality of entities; and
    a cache, comprising a plurality of cache partitions with at least one cache partition assigned as a private cache for an entity of the plurality of entities; and
    a controller configured to size reallocate at least one of the plurality of cache partitions based on behavior of at least two of the plurality of cache partitions, and wherein the controller is configured to detect a predetermined cache partition condition for size reallocating a set of cache partitions of the plurality of cache partitions,
    wherein the predetermined cache partition condition comprises an average number of hits to a first cache partition of the set crossing a predetermined upper hit average threshold and an average number of hits to a second cache partition of the set crossing a predetermined lower hit average threshold.

14. The system of claim 13, wherein each entity of the plurality of entities is assigned a different cache partition of the plurality of cache partitions as a private cache for each entity.

15. The system of claim 13, wherein the controller is configured to perform cacheline replacement for the entity exclusively in the private cache.

16. The system of claim 13, wherein the controller is configured to read the plurality of cache partitions for the entity.

17. The system of claim 13, wherein the controller is configured to reallocate the number of the plurality of cache partitions.

18. The system of claim 13, wherein the controller is configured to size reallocate a set of cache partitions of the plurality of cache partitions.

* * * * *